(12) United States Patent
Lu et al.

(10) Patent No.: US 8,057,781 B2
(45) Date of Patent: Nov. 15, 2011

(54) FABRICATION METHOD FOR CHALCOPYRITE POWDER

(75) Inventors: Chung-Hsin Lu, Taipei (TW);
Chung-Hsien Wu, Taipei (TW);
Szu-Chia Chien, Taipei (TW);
Zhi-Liang Liu, Taipei (TW)

(73) Assignee: National Taiwan University, Taipei (TW)

(*) Notice: Subject to any disclaimer, the term of this patent is extended or adjusted under 35 U.S.C. 154(b) by 0 days.

(21) Appl. No.: 12/813,403

(22) Filed: Jun. 10, 2010

(65) Prior Publication Data
US 2010/0329967 A1 Dec. 30, 2010

(30) Foreign Application Priority Data
Jun. 24, 2009 (TW) ................ 98121317 A

(51) Int. Cl.
*C01B 17/00* (2006.01)
*C01B 19/00* (2006.01)

(52) U.S. Cl. ........ 423/508; 423/511; 977/814; 977/815; 427/76

(58) Field of Classification Search ............ 423/508, 423/511; 977/814, 815; 427/76
See application file for complete search history.

(56) References Cited

U.S. PATENT DOCUMENTS

| | | | |
|---|---|---|---|
| 5,445,847 A * | 8/1995 | Wada et al. ............ | 427/74 |
| 6,268,014 B1 * | 7/2001 | Eberspacher et al. ...... | 427/74 |
| 2010/0133479 A1 * | 6/2010 | Huang et al. ............ | 252/501.1 |

* cited by examiner

*Primary Examiner* — Timothy Vanoy
(74) *Attorney, Agent, or Firm* — Pai Patent & Trademark Law Firm; Chao-Chang David Pai

(57) ABSTRACT

The invention provides a fabrication method for a chalcopyrite powder. The fabrication method includes: (a) mixing a Group IB compound and a Group IIIA compound in a solvent; (b) drying or precipitating the solution of step (a) to obtain a precursor containing Group IB and Group IIIA elements; (c) mixing a solution or powder containing a Group VIA compound with the precursor; and (d) heating the mixture of step (c) to obtain the chalcopyrite powder.

28 Claims, 1 Drawing Sheet

FABRICATION METHOD FOR CHALCOPYRITE POWDER

CROSS REFERENCE TO RELATED APPLICATIONS

This Application claims priority of Taiwan Patent Application No. 098121317, filed on Jun. 24, 2009, the entirety of which is incorporated by reference herein.

BACKGROUND OF THE INVENTION

1. Field of the Invention

The present invention relates to a fabrication method for semiconductor materials, and in particular relates to a fabrication method for a chalcopyrite powder.

2. Description of the Related Art

Semiconductor materials have a special band gap which can be regulated by changing the composition of the semiconductor material. Therefore, semiconductor materials are often used as light absorbing layers of a photoelectronic device.

Among the different semiconductor materials used in CIGS solar cell, the Group IB-IIIA-VIA compound, which has a chalcopyrite structure, has been intensely researched. When a thin film made by the Group IB-IIIA-VIA compound is applied to a CIGS solar cell, good photoelectric conversion efficiency of the CIGS solar cell is obtained.

A thin film having the chalcopyrite compound is fabricated by a vacuumed or non-vacuumed process. The vacuum process comprises a co-evaporation or sputtering process. The non-vacuum process comprises an electrodeposition, electroless, coating or chemical spray pyrolysis process. Because, the vacuum process can only be applied to small-scale photoelectronic devices and equipment for the vacuum process is expensive, a non-vacuum process has been developed.

The conventional vacuum process is described as follows. Firstly, a precursor containing the Group IB and IIIA metal ions is deposited on a substrate. The precursor is then subjected to reduction and selenization processes at high temperatures to obtain a chalcopyrite compound. However, the Group IIIA metal has a low melting point, thus non-uniformed thin films are formed at high temperatures due to aggregation. As such, various fabrication methods for forming uniformed thin films with the chalcopyrite compound have been developed.

U.S. Pat. No. 5,445,847 discloses a fabrication method for a chalcopyrite compound. Firstly, a Group IB powder and an IIIA powder are mixed in a ball mill and sintered at a high temperature to obtain an IB-IIIA oxide. The IB-IIIA oxide is heated under gas containing Group VIA elements to obtain the chalcopyrite compound.

U.S. Pat. No. 6,268,014 also discloses a fabrication method for a chalcopyrite compound. The IB-IIIA oxide particles are first fabricated. Then, the IB-IIIA oxide particles are coated on a substrate by a spray process and are heated under the gas containing Group VIA elements to obtain the chalcopyrite compound.

However, both fabrication methods form non-uniformed thin films with the chalcopyrite compound. Accordingly, there is a need to develop a chalcopyrite powder which may be fabricated to form a uniform thin film with small size.

BRIEF SUMMARY OF THE INVENTION

The invention provides a fabrication method for a chalcopyrite powder, comprising: (a) mixing a Group IB compound and a Group IIIA compound in a solvent; (b) drying or precipitating the solution of step (a) to obtain a precursor containing Group IB and Group IIIA elements; (c) mixing a solution or powder containing a Group VIA compound with the precursor; and (d) heating the mixture of step (c) to obtain the chalcopyrite powder.

The invention also provides a fabrication method for a chalcopyrite powder, comprising: (a) mixing a Group IB compound, a Group IIIA compound a Group VIA compound in a solvent; (b) drying or precipitating the solution of step (a) to obtain a precursor containing Group IB, IIIA and VIA elements; and (c) heating the mixture of step (c) to obtain the chalcopyrite powder.

A detailed description is given in the following embodiments with reference to the accompanying drawings.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

Figure 1:
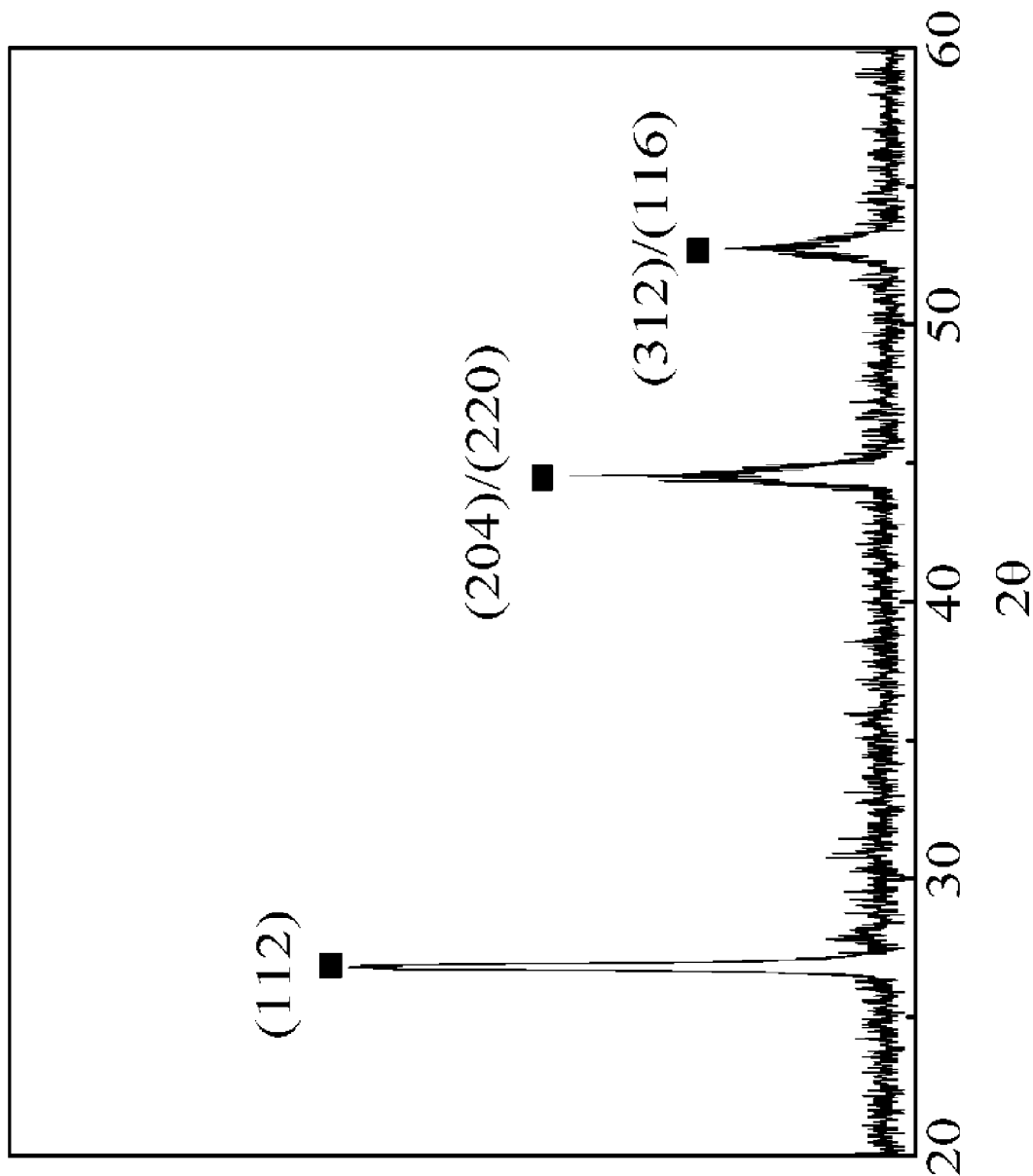
FIG. 1 shows an X-ray diffraction image of the chalcopyrite powder of the invention.

The following description is of the best-contemplated mode of carrying out the invention. This description is made for the purpose of illustrating the general principles of the invention and should not be taken in a limiting sense. The scope of the invention is best determined by reference to the appended claims.

The invention provides a fabrication method for a chalcopyrite powder. The fabrication method comprises the steps (a) to (d). The fabrication method begins with step (a) in which a Group IB compound and a Group IIIA compound are mixed in a solvent. The Group IB elements comprise copper (Cu), silver (Ag), gold (Au) or combinations thereof. The Group IB compound comprises the following compounds containing Group IB elements: oxide, nitride, hydroxide, halogenide, nitrate, acetate, sulfate, carbonate, chlorate, phosphate, selenate, citrate or phosphide, such as copper oxide (CuO), copper azide (Cu(N$_3$)$_2$), copper hydroxide (Cu(OH)$_2$), copper chloride (CuCl$_2$), silver nitrate (AgNO$_3$), copper nitrate (Cu(NO3)2), copper sulfate (CuSO$_4$), copper acetate (Cu(CH3COO)$_2$), silver acetate (CH$_3$COOAg), cuprous carbonate(Cu$_2$CO$_3$), copper oxalate (CuC$_2$O$_4$), copper chlorate (Cu(ClO4)$_2$), copper phosphate (Cu$_3$(PO$_4$)$_2$), copper selenate (CuSeO$_4$) or copper phosphide (Cu$_3$P).

The Group IIIA elements comprise aluminum (Al), indium (In), gallium (Ga) or combinations thereof. The Group IIIA compound comprises the following compounds containing Group IIIA elements: oxide, nitride, hydroxide, halogenide, nitrate, acetate, sulfate, carbonate, chlorate, phosphate, selenate, citrate or phosphide, such as indium oxide (In$_2$O$_3$), gallium oxide (Ga$_2$O$_3$), indium nitride (InN), gallium nitride (GaN), indium hydroxide (In(OH)$_3$), gallium hydroxide (Ga(OH)$_3$), aluminum chloride (AlCl$_3$), indium chloride (InCl$_3$), gallium chloride (GaCl$_3$), aluminum nitrate (Al(NO$_3$)$_3$), indium nitrate (In(NO$_3$)$_3$), gallium nitrate (Ga(NO$_3$)$_3$), indium acetate (In(CH$_3$COO)$_3$), aluminum acetate (Al(CH$_3$COO)$_3$), aluminum carbonate (Al$_2$(CO$_3$)$_3$), aluminum oxalate (Al$_2$(C$_2$O$_4$)$_3$), gallium acetate (Ga(CH$_3$COO)$_3$), indium sulfate (In$_2$(SO$_4$)$_3$), aluminum sulfate (Al$_2$(SO$_4$)$_3$), gallium sulfate (Ga$_2$(SO$_4$)$_3$), indium chlorate (In(ClO$_4$)$_3$), gallium chlorate (Ga(ClO$_4$)$_3$), indium phosphate (InPO$_4$), gallium phosphate (GaPO$_4$), indium selenate (In$_2$(SeO$_4$)$_3$), gallium selenate (Ga$_2$(SeO$_4$)$_3$), indium phosphide (InP), or gallium phosphide (GaP).

The Group IB compound and the Group IIIA compound in step (a) have a molar ratio of (0.7-1.4):(0.7-1.4), or preferably (0.8-1.3):(0.8-1.3), or even further preferably (0.8-1.2):(0.8-1.2).

The Group IB compound and the Group IIIA compound are not limited to the above compounds, other compounds containing Group IB, Group IIIA elements are also included within the scope of the invention. The solvent comprises water, acid, base, alcohol, ketone, ether, amine or other organic solvent. These solvents are non-toxic solvents. The type of acid used, is such as, nitric acid, hydrochloric acid, sulfuric acid, acetic acid, pyruvic acid or citric acid. The type of base used, is such as, sodium hydroxide or ammonium water. The type of alcohol used, is such as, methanol, ethanol, propanol, isopropanol, 1-butanol, isopentanol or ethylene glycol. The type of ketone used, is such as acetone, butanone or methyl isobutyl ketone. The type of ether used, is such as, methyl ether, ethyl ester, methyl ethyl ether, diphenyl ether, ethylene glycol monomethyl ether, ethylene glycol monobutyl ether or ethylene glycol monoethyl ether acetate. The type of amine used, is such as, ethylamine, dimethyl acetamide, triethanol amine or diethanol amine. However, the solvents are not limited to the type of solvents mentioned herein, as other solvents which can dissolve the above compounds may be implemented, and are within the scope of this invention.

In one embodiment, CuCl$_2$ and InCl$_3$ are mixed in water to form the solution of step (a).

Further, other ions are also mixed into the solution of step (a) to improve the efficiency of solar cells made therefrom. For example, the Group IA compounds are added to improve the photoelectric conversion efficiency of the solar cell. The Group IA elements comprise lithium (Li), sodium (Na), potassium (K) or combinations thereof. The Group IA compound comprises the following compounds containing Group IA elements: halogenide, nitrate, acetate, sulfate, carbonate or chlorate, such as lithium chloride (LiCl), sodium chloride (NaCl), potassium chloride (KCl), lithium nitrate (LiNO$_3$), sodium nitrate (NaNO$_3$), potassium nitrate (KNO$_3$), lithium acetate (CH$_3$COOLi), sodium acetate (CH$_3$COONa), potassium acetate (CH$_3$COOK), lithium sulfate (Li$_2$SO$_4$), sodium sulfate (Na$_2$SO$_4$), potassium sulfate (K$_2$SO$_4$), lithium carbonate (Li$_2$CO$_3$), sodium carbonate (Na$_2$CO$_3$), potassium carbonate (K$_2$CO$_3$), lithium chlorate (LiClO$_3$), sodium chlorate (NaClO$_3$) or potassium chlorate (KClO$_3$).

Additionally, a polymerization agent is also mixed into the solution of step (a). The function of the polymerization agent is to help the cations (such as Cu$^{2+}$, In$^{3+}$ or Ga$^{3+}$) to be well dispersed in the solution of step (a). The polymerization agent comprises ethylenediaminetetraacetic acid (EDTA), ethylene glycol, polyethylene glycol, polyvinyl alcohol, citric acid, oxalic acid, propionic acid, tartaric acid, maleic acid or combinations thereof.

Then, the fabrication method continues with step (b) in which the solution of step (a) is dried and precipitated to obtain a precursor containing Group IB and Group IIIA elements. The drying methods used comprise low temperature drying, infrared (IR) heating, microwave heating or freeze drying. In one embodiment, a base solution (such as sodium hydroxide solution) is added into the solution of step (a) to precipitate the Group IB and Group IIIA ions to obtain a precursor containing Group IB and Group IIIA elements, wherein the pH value of the base solution is larger than about 8, or preferably larger than about 10. The precursor and the Group IA compound have a molar ratio of about (10-2000):1.

Note that compared with the fabrication methods in prior art (the Group IIIA metals easily aggregate at high temperatures), the Group IB and Group IIIA compound of the invention are first dissolved and then dried. Therefore, the precursor containing the Group IB and Group IIIA compound has uniform and small particle sizes.

Additionally, before the step (c) and after the step (b), the fabrication method further comprises a step of filtering and drying the precursor. The precursor is filtered by deionized water. The filtering step may be repeated several times. The drying methods comprise a low temperature drying, infrared (IR) heating, microwave heating or freeze drying process. However, other drying methods which can remove all of the solvents are included within the scope of the invention. In another embodiment, the step of filtering and drying the precursor may be omitted. Further, in order to avoid the interference of organic contaminants resulting from the fabrication steps, the precursor is heated to remove the unwanted organic contaminants.

Then, the fabrication method continues with step (c) in which a solution or powder containing the Group VIA compounds is mixed with the precursor. The Group VIA elements comprise sulfur (S), selenium (Se), tellurium (Te) or combinations thereof. The Group VIA compound comprises the following compounds containing Group VIA elements: oxide, halogenide, oxyhalogenide, sulfide, selenide, amine, carbamide, selenate, sulfate, or telenide, such as selenium dioxide (SeO$_2$), tellurium dioxide (TeO$_2$), sulfuric acid (H$_2$SO$_4$), selenic acid (H$_2$SeO$_4$), telluric acid (H$_2$TeO$_4$), sulfurous acid (H$_2$SO$_3$), selenious acid (H$_2$SeO$_3$), tellurous acid (H$_2$TeO$_3$), thiourea (CS(NH$_2$)$_2$), selenourea(CSe(NH$_2$)$_2$), selenium dichloride (SeCl$_2$), selenium tetrachloride (SeCl$_4$), tellurium dichloride (TeCl$_2$), tellurium tetrachloride (TeCl$_4$), selenium dibromide (SeBr$_2$), selenium tetrabromide (SeBr$_4$), tellurium dibromide (TeBr$_2$), tellurium tetrabromide (TeBr$_4$), selenium oxychloride (SeOCl$_2$) or selenium disulfide (SeS$_2$). The solution or powder containing the Group VIA compound and the precursor have a molar ratio of about (0.1-20):1, or preferably (0.1-15):1, or even further preferably (0.1-10):1.

In one embodiment, the Group VIA compound and the precursor are mixed in a ball mill with a molar ratio of about 10:1.

In prior art, the Group VIA elements are supplied by purging the gas containing the Group VIA compound. However, in prior art methods, the gas only contacts the upper surface of the precursor and does not reach the bottom of the precursor. Thus, chemical reaction only occurs at the surface of the precursor, thereby obtaining non-uniform chalcopyrite powder. Compared with prior art, because the solution or powder containing Group VIA elements of the invention are mixed, uniform chalcopyrite powder is obtained.

The steps (a) to step (c) are performed under room temperature and normal pressure. There is no need to especially control the pressure, atmosphere, temperature and humidity during implementation of the fabrication steps (a) to (c).

Next, the fabrication method continues with step (d) in which the mixture of step (c) is heated to obtain the chalcopyrite powder. The mixture of step (c) is heated within an atmosphere containing nitrogen (N$_2$), hydrogen (H$_2$), argon (Ar), carbon monoxide (CO), carbon dioxide (CO$_2$), ammonia (NH$_3$), nitrogen oxide (NO) or combinations thereof.

The mixture of step (c) is heated at a temperature of about 300° C.-700° C., or preferably 400° C.-600° C. The mixture of step (c) is heated for about 0.1 hr-48 hr, or preferably 0.3 hr-24 hr, or even further preferably 0.5 hr-18 hr. Further, those skilled in the art may design various temperature gradients according to application. The temperature ramp up and down rate is about 0.3° C./min -100° C./min, or preferably 0.5° C./min-50° C./min, or even further preferably 1° C./min-30° C./min. If the temperature ramp up and down rate is controlled well, a good quality of the chalcopyrite powder is obtained.

Additionally, in order to supply the Group VIA elements sufficiently, another atmospheric environment containing the Group VIA elements, such as hydrogen selenide ($H_2Se$), hydrogen sulfide (HS), selenium vapor (Se), sulfur vapor (S), tellurium (Te) or combinations thereof is also provided during the heating of step (d).

The invention provides a second embodiment of a fabrication method for a chalcopyrite powder. The fabrication method comprises the steps (a) to (c). The fabrication method begins with step (a) in which a Group IB compound, a Group IIIA compound and a Group VIA compound are mixed in a solvent, wherein the Group IB compound, the Group IIIA compound and the Group VIA compound in step (a) have a molar ratio of (0.7-1.4):(0.7-1.4):(0.1-20), or preferably (0.8-1.3):(0.8-1.3):(0.1-15), or even further preferably (0.8-1.2):(0.8-1.2):(0.1-10). The Group IB compound, the Group IIIA compound, the Group VIA compound, and the solvent are as described above, thus repeated descriptions are omitted.

Then, the fabrication method continues with step (b) in which the solution of step (a) is dried and precipitated to obtain a precursor containing Group IB, Group IIIA and Group VIA elements, wherein the drying methods and precipitating methods are as described above, thus repeated descriptions are omitted.

Next, the fabrication method continues with step (c) in which the precursor of step (b) is heated to obtain the chalcopyrite powder, wherein the experimental conditions of the heating step (such as temperature, time or gas) is the same as the first embodiment, thus repeated descriptions are omitted.

Compared with the first embodiment, the advantage of the second embodiment is that the Group VIA compound is first mixed in step (a), thereby requiring less fabrication time. A uniform powder like the first embodiment is obtained.

The scanning electron microscopy (SEM) images of the chalcopyrite powder of the invention show that the particles sizes are uniform and about 0.1 μm -20 or preferably 0.5 μm -10 μm in size. Additionally, the X-ray diffraction images show that the reaction products of the IB-IIIA-VIA compounds made by the above steps have the chalcopyrite structures.

The fabrication method for the chalcopyrite powder of the invention has several advantages:

(1) Compared with the fabrication methods in prior art (the Group IIIA metals easily aggregate at high temperature), the Group IB and Group IIIA compound of the invention are first dissolved and then dried. Therefore, the precursor containing the Group IB and Group IIIA compound has uniform and small particle sizes.

(2) Compared with prior art (the Group VIA elements are supplied by purging the gas containing the Group VIA compound), the Group VIA elements are supplied by mixing the solution or powder containing the Group VIA compound, thereby obtaining a uniform chalcopyrite powder of the invention.

(3) The fabrication method of the invention is easy and inexpensive, and the uniform chalcopyrite powder may be used in devices which are mass produced.

The uniform and small particle sized the chalcopyrite powder of the invention may be used as a target of a vacuum process, wherein the vacuum process comprises an evaporation or sputter process.

Further, the chalcopyrite powder of the invention made in a slurry form may be used as a material in a coating process, wherein the coating process comprises a spin coating, bar coating, dip coating, roll coating, spray coating, gravure coating, ink jet printing, slot coating or blade coating process. Additionally, the chalcopyrite powder may be used as a light-absorbing material of a solar cell.

Example

Example 1

According to the stoichiometric ratio of the $CuInSe_2$ compound, $CuCl_2$ and $InCl_3$ were mixed in an aqueous solution. Then, the aqueous solution was dripped slowly into a sodium hydroxide (NaOH) solution (pH=9) to form the precipitates. After filtering and drying, the precipitates and the excess selenium (Se) powder were mixed in a ball mill, wherein the Se powder and the metal ions ($Cu^{2+}$ and $In^{3+}$ ions) had a molar ratio of 10/1. Then, the mixture was heated under $N_2/H_2$ atmosphere at 500° C. for 1 hr to obtain a $CuInSe_2$ powder.

FIG. 1 shows the X-ray diffraction pattern of the $CuInSe_2$ powder. The characteristic XRD peaks observed correspond to the (112), (204)/(220) and (116)/(312) phase which were confirmed to have a chalcopyrite structure (ICCD card number 89-5649). The SEM image of the $CuInSe_2$ powder shows that the $CuInSe_2$ powder had uniform and small particle sizes.

Example 2

According to the stoichiometric ratio of the $CuIn_{0.3}Ga_{0.7}Se_2$ compound, $CuCl_2$, $InCl_3$, $Ga(NO_3)_3$ and $SeO_2$ were mixed in an aqueous solution. Then, a 5 mole % of sodium chloride (NaCl) solution was added into the aqueous solution. The mixed solution was dried to form the precipitates. Then, the precipitates were heated under $N_2/H_2$ mixed atmosphere containing selenium vapor at 550° C. for 0.5 hr to obtain a $CuIn_{0.3}Ga_{0.7}Se_2$ powder.

The characteristic XRD peaks of the $CuIn_{0.3}Ga_{0.7}Se_2$ powder observed correspond to the (112), (204)/(220) and (116)/(312) phase which were confirmed to have a chalcopyrite structure.

Example 3

According to the stoichiometric ratio of the $CuIn_{0.7}Ga_{0.3}Se_2$ compound, $CuCl_2$, $InCl_3$, $Ga(NO_3)_3$ and $SeO_2$ were mixed in ethanol solution. The ethanol solution was dried by heating to obtain the precipitates. Then, the precipitates and the excess selenium (Se) powder were mixed in a ball mill, wherein the Se powder and the metal ions ($Cu^{2+}$, $In^{3+}$ and $Ga^{3+}$ ions) had a molar ratio of 0.2/1. Then, the mixture was heated under $N_2/H_2$ mixed atmosphere containing selenium vapor at 550° C. for 0.5 hr to obtain a $CuIn_{0.7}Ga_{0.3}Se_2$ powder.

The characteristic XRD peaks of the $CuIn_{0.7}Ga_{0.3}Se_2$ powder observed correspond to the (112), (204)/(220) and (116)/(312) phase which were confirmed to have a chalcopyrite structure (ICCD card number 35-1102).

Example 4

According to the stoichiometric ratio of the $Cu_{1.2}AlSe_2$ compound, $CuCl_2$ and $Al(NO_3)_3$ were mixed in ethylenegly-col monomethyl ether solution. Then, a 10 mole % of the sodium chloride (NaCl) solution and the excess selenic acid ($H_2SeO_4$) were added into the ethyleneglycol monomethyl ether solution, wherein the $Se^{3+}$ ions and the metal ions ($Cu^{2+}$ and $Al^{3+}$ ions) had a molar ratio of 10/1. The solution was dried to obtain the precipitates. Then, the precipitates were heated under $N_2/H_2$ atmosphere at 450° C. for 1 hr to obtain a $Cu_{1.2}AlSe_2$ powder.

The characteristic XRD peaks of the $Cu_{1.2}AlSe_2$ powder observed correspond to the (112), (204)/(220) and (116)/(312) phase which were confirmed to have a chalcopyrite structure (ICCD card number 75-0101).

Example 5

According to the stoichiometric ratio of the $Cu_{0.8}GaSeS$ compound, $CuCl_2$ and $Ga(NO_3)_3$ were mixed in a nitric acid solution. Then, a 10 mole % of the potassium chloride (KCl) solution was added into the nitric acid solution. The mixed nitric acid solution was dried to obtain the precipitates. Then, the precipitates and the excess selenium (Se) and sulfur (S) powder were mixed in a ball mill, wherein the Se and S powder and the metal ions ($Cu^{2+}$ and $In^{3+}$ ions) had a molar ratio of 5/1. Then, the mixture was heated under $N_2/H_2$ atmosphere at 450° C. for 1 hr to obtain a $Cu_{0.8}GaSeS$ powder.

The characteristic XRD peaks of the $Cu_{0.8}GaSeS$ powder observed correspond to the (112), (204)/(220) and (116)/(312) phase which were confirmed to have a chalcopyrite structure (ICCD card number 36-1312).

Example 6

According to the stoichiometric ratio of $AgIn_{1.3}S_2$ compound, $AgNO_3$ and $In(NO_3)_3$ were mixed in an aqueous solution. Then, the aqueous solution was dripped slowly into a potassium hydroxide (KOH) solution to form the precipitates. After filtering and drying, the precipitates and the excess sulfur (S) powder were mixed in a ball mill, wherein the Se powder and the metal ions ($Ag^+$ and $In^{3+}$ ions) had a molar ratio of 3/1. Then, the mixture was heated under vacuum at 500° C. for 36 hr to obtain an $AgIn_{1.3}S_2$ powder.

The characteristic XRD peaks of the $AgIn_{1.3}S_2$ powder observed correspond to the (112), (204)/(220) and (116)/(312) phase which were confirmed to have a chalcopyrite structure (ICCD card number 75-2379).

Example 7

According to the stoichiometric ratio of the $CuInSe_2$ compound, $CuCl_2$ and $InCl_3$ were mixed in an aqueous solution. Then, citric acid and ethylene glycol were added into the aqueous solution to be used as a polymerization agent.

Then, the aqueous solution was stirred well and heated at 500° C. for 1 hr to remove the unwanted organic contaminants to obtain a precursor. The precursor and the excess selenium (Se) powder were mixed in a ball mill, wherein the Se powder and the metal ions ($Cu^{2+}$ and $In^{3+}$ ions) had a molar ratio of 10/1. Then, the mixture was heated under $N_2/H_2$ atmosphere at 500° C. for 3 hr to obtain a $CuIn_tSe_2$ powder.

The characteristic XRD peaks of the $CuIn_1Se_2$ powder observed correspond to the (112), (204)/(220) and (116)/(312) phase which were confirmed to have a chalcopyrite structure (ICCD card number 89-5646).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fabrication method for a chalcopyrite powder, comprising:
   (a) mixing a Group IB compound and a Group IIIA compound in a solvent;
   (b) drying or precipitating the solution of step (a) to obtain a precursor containing Group IB and Group IIIA elements;
   (c) mixing a solution or powder containing a Group VIA compound with the precursor; and
   (d) heating the mixture of step (c) to obtain the chalcopyrite powder.

2. The fabrication method for a chalcopyrite powder as claimed in claim 1, wherein the Group IB elements comprise copper (Cu), silver (Ag), gold (Au) or combinations thereof.

3. The fabrication method for a chalcopyrite powder as claimed in claim 1, wherein the Group IB compound comprises the following compounds containing Group IB elements: oxide, nitride, hydroxide, halogenide, nitrate, acetate, sulfate, carbonate, chlorate, phosphate, selenate, citrate or phosphide.

4. The fabrication method for a chalcopyrite powder as claimed in claim 1, wherein the Group IIIA elements comprise aluminum (Al), indium (In), gallium (Ga) or combinations thereof.

5. The fabrication method for a chalcopyrite powder as claimed in claim 1, wherein the Group IIIA compound comprises the following compounds containing Group IIIA elements: oxide, nitride, hydroxide, halogenide, nitrate, acetate, sulfate, carbonate, chlorate, phosphate, selenate, citrate or phosphide.

6. The fabrication method for a chalcopyrite powder as claimed in claim 1, wherein the Group IB compound and the Group IIIA compound have a molar ratio of (0.7-1.4):(0.7-1.4).

7. The fabrication method for a chalcopyrite powder as claimed in claim 1, wherein the solvent comprises water, acid, base, alcohol, ketone, ether, amine or combinations thereof.

8. The fabrication method for a chalcopyrite powder as claimed in claim 1, in step (a) further comprising mixing a Group IA compound in the solvent.

9. The fabrication method for a chalcopyrite powder as claimed in claim 8, wherein the Group IA compound comprises the following compounds containing Group IA elements: halogenide, nitrate, acetate, sulfate, carbonate or chlorate.

10. The fabrication method for a chalcopyrite powder as claimed in claim 9, wherein the Group IA elements comprise lithium (Li), sodium (Na), potassium (K) or combinations thereof.

11. The fabrication method for a chalcopyrite powder as claimed in claim 8, wherein the precursor and the Group IA compound have a molar ratio of about (10-2000):1.

12. The fabrication method for a chalcopyrite powder as claimed in claim 1, in step (a) further comprising mixing a polymerization agent in the solvent.

13. The fabrication method for a chalcopyrite powder as claimed in claim 12, wherein the polymerization agent comprises ethylenediaminetetraacetic acid (EDTA), ethylene glycol, polyethylene glycol, polyvinyl alcohol, citric acid, oxalic acid, propionic acid, tartaric acid, maleic acid or combinations thereof.

14. The fabrication method for a chalcopyrite powder as claimed in claim 1, wherein the drying in step (b) is performed by a method comprising low temperature drying, infrared (IR) heating, microwave heating or freeze drying.

15. The fabrication method for a chalcopyrite powder as claimed in claim 1, after the step (b), further comprising filtering and drying the precursor.

16. The fabrication method for a chalcopyrite powder as claimed in claim 1, wherein the Group VIA compound comprises the following compounds containing Group VIA elements: oxide, halogenide, oxyhalogenide, sulfide, selenide, amine, carbamide, selenate, sulfate or telenide.

17. The fabrication method for a chalcopyrite powder as claimed in claim 16, wherein the Group VIA elements comprise sulfur (S), selenium (Se), tellurium (Te) or combinations thereof.

18. The fabrication method for a chalcopyrite powder as claimed in claim 1, wherein the solution or powder containing the Group VIA compound in step (c) and the precursor have a molar ratio of about (0.1-20):1.

19. The fabrication method for a chalcopyrite powder as claimed in claim 1, wherein the mixture of step (c) is heated under a vacuumed or non-vacuumed environment.

20. The fabrication method for a chalcopyrite powder as claimed in claim 1, wherein the mixture of step (c) is heated within an atmosphere containing nitrogen ($N_2$), hydrogen ($H_2$), argon (Ar), carbon monoxide (CO), carbon dioxide ($CO_2$), ammonia ($NH_3$), nitrogen oxide (NO) or combinations thereof.

21. The fabrication method for a chalcopyrite powder as claimed in claim 20, wherein the atmosphere further comprises hydrogen selenide ($H_2Se$), hydrogen sulfide ($H_2S$), selenium vapor (Se), sulfur vapor (S), tellurium (Te) or combinations thereof.

22. The fabrication method for a chalcopyrite powder as claimed in claim 1, wherein the mixture of step (c) is heated in step (d) at a temperature of about 300° C.-700° C.

23. The fabrication method for a chalcopyrite powder as claimed in claim 1, wherein the mixture of step (c) is heated in step (d) for about 0.1 hr-48 hr.

24. The fabrication method for a chalcopyrite powder as claimed in claim 1, wherein the chalcopyrite powder is used as a target of a vacuum process.

25. The fabrication method for a chalcopyrite powder as claimed in claim 24, wherein the vacuum process comprises an evaporation or sputter process.

26. The fabrication method for a chalcopyrite powder as claimed in claim 1, wherein the chalcopyrite powder is used as a material in a coating process.

27. The fabrication method for a chalcopyrite powder as claimed in claim 26, wherein the coating process comprises a spin coating, bar coating, dip coating, roll coating, spray coating, gravure coating, ink jet printing, slot coating or blade coating process.

28. The fabrication method for a chalcopyrite powder as claimed in claim 1, wherein the chalcopyrite powder is used as a light-absorbing material of a solar cell.

* * * * *